US 11,394,196 B2

United States Patent
Olszyk et al.

(10) Patent No.: US 11,394,196 B2
(45) Date of Patent: Jul. 19, 2022

(54) INTERACTIVE APPLICATION TO PROTECT PET CONTAINMENT SYSTEMS FROM EXTERNAL SURGE DAMAGE

(71) Applicant: Radio Systems Corporation, Knoxville, TN (US)

(72) Inventors: Christopher G. Olszyk, Knoxville, TN (US); Albert Leon Lee, IV, Knoxville, TN (US); Duane A. Gerig, Knoxville, TN (US); Thomas Brandon Lee, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 15/809,809

(22) Filed: Nov. 10, 2017

(65) Prior Publication Data

US 2019/0148933 A1    May 16, 2019

(51) Int. Cl.
*G08B 21/18* (2006.01)
*H02H 7/20* (2006.01)
*A01K 15/02* (2006.01)

(52) U.S. Cl.
CPC ............ *H02H 7/20* (2013.01); *G08B 21/18* (2013.01); *A01K 15/023* (2013.01)

(58) Field of Classification Search
CPC .......... G08G 1/07; G08G 1/005; G08G 1/095; G08G 1/0955; G08B 21/02; G08B 21/18;
(Continued)

(56) References Cited

U.S. PATENT DOCUMENTS 2,364,994 A * 12/1944 Moore ............... H05C 1/04
109/42
2,741,224 A   4/1956 Putnam
(Continued)

FOREIGN PATENT DOCUMENTS

CN     101112181 A      1/2008
CN     101937015 A *    1/2011
(Continued)

OTHER PUBLICATIONS

Extended European Search Report for Application No. EP17180645, dated May 9, 2018, 7 pages.
(Continued)

*Primary Examiner* — Hai Phan
*Assistant Examiner* — Anthony D Afrifa-Kyei
(74) *Attorney, Agent, or Firm* — Baker, Donelson, Bearman, Caldwell & Berkowitz PC (57) ABSTRACT

A system is described that includes a signal generator, a boundary loop wire, and a disconnect device, wherein the boundary loop wire is positionable at a location to define a boundary of a containment area, wherein the disconnect device is configured to communicatively couple over a network with one or more applications, wherein the one or more applications run on at least one processor. The system includes the signal generator for driving a current through the boundary loop wire. The disconnect device comprises a first component for disconnecting the boundary loop wire from the signal generator. The one or more applications are configured to send the disconnect device an instruction, wherein the instruction comprises disconnecting the boundary loop wire from the signal generator.

25 Claims, 6 Drawing Sheets

(58) Field of Classification Search
CPC ... G08B 5/36; G08B 6/00; B60Q 1/26; B60Q 1/2673; B60Q 1/50; B60Q 1/525; B60Q 9/008; B66F 17/003
See application file for complete search history.

(56) References Cited

U.S. PATENT DOCUMENTS

| | | | |
|---|---|---|---|
| 3,182,211 A * | 5/1965 | Maratuech | H05C 1/04 256/10 |
| 3,184,730 A | 5/1965 | Irish | |
| 3,500,373 A | 3/1970 | Arthur | |
| 3,735,757 A | 5/1973 | Mac Farland | |
| 4,180,013 A | 12/1979 | Smith | |
| 4,426,884 A | 1/1984 | Polchaninoff | |
| 4,783,646 A | 11/1988 | Matsuzaki | |
| 4,794,402 A | 12/1988 | Gonda et al. | |
| 4,802,482 A | 2/1989 | Gonda et al. | |
| 4,947,795 A | 8/1990 | Farkas | |
| 4,969,418 A | 11/1990 | Jones | |
| 5,054,428 A | 10/1991 | Farkus | |
| 5,159,580 A | 10/1992 | Andersen et al. | |
| 5,161,485 A | 11/1992 | Mcdade | |
| 5,182,032 A | 1/1993 | Dickie et al. | |
| 5,207,178 A | 5/1993 | Mcdade et al. | |
| 5,207,179 A | 5/1993 | Arthur et al. | |
| 5,471,954 A | 12/1995 | Gonda et al. | |
| 5,526,006 A | 6/1996 | Akahane et al. | |
| 5,559,498 A | 9/1996 | Westrick et al. | |
| 5,576,972 A | 11/1996 | Harrison | |
| 5,586,521 A | 12/1996 | Kelley | |
| 5,601,054 A | 2/1997 | So | |
| 5,642,690 A | 7/1997 | Calabrese et al. | |
| 5,749,324 A | 5/1998 | Moore | |
| 5,794,569 A | 8/1998 | Titus et al. | |
| 5,810,747 A | 9/1998 | Brudny et al. | |
| 5,815,077 A | 9/1998 | Christiansen | |
| 5,844,489 A | 12/1998 | Yarnall, Jr. et al. | |
| 5,857,433 A | 1/1999 | Files | |
| 5,870,029 A | 2/1999 | Otto et al. | |
| 5,872,516 A | 2/1999 | Bonge, Jr. | |
| 5,886,669 A | 3/1999 | Kita | |
| 5,913,284 A | 6/1999 | Van Curen et al. | |
| 5,923,254 A | 7/1999 | Brune | |
| 5,927,233 A | 7/1999 | Mainini et al. | |
| 5,933,079 A | 8/1999 | Frink | |
| 5,934,225 A | 8/1999 | Williams | |
| 5,949,350 A | 9/1999 | Girard et al. | |
| 5,957,983 A | 9/1999 | Tominaga | |
| 5,982,291 A | 11/1999 | Williams et al. | |
| 6,016,100 A | 1/2000 | Boyd et al. | |
| 6,019,066 A | 2/2000 | Taylor | |
| 6,028,531 A | 2/2000 | Wanderlich | |
| 6,047,664 A | 4/2000 | Lyerly | |
| 6,067,018 A | 5/2000 | Skelton et al. | |
| 6,075,443 A | 6/2000 | Schepps et al. | |
| 6,166,643 A * | 12/2000 | Janning | A01K 15/023 119/908 |
| 6,170,439 B1 | 1/2001 | Duncan et al. | |
| 6,184,790 B1 | 2/2001 | Gerig | |
| 6,196,990 B1 | 3/2001 | Zicherman | |
| 6,204,762 B1 | 3/2001 | Dering et al. | |
| 6,215,314 B1 | 4/2001 | Frankewich, Jr. | |
| 6,230,031 B1 | 5/2001 | Barber | |
| 6,230,661 B1 | 5/2001 | Yarnall, Jr. et al. | |
| 6,232,880 B1 | 5/2001 | Anderson et al. | |
| 6,271,757 B1 | 8/2001 | Touchton et al. | |
| 6,297,766 B1 | 10/2001 | Koeller | |
| 6,327,999 B1 | 12/2001 | Gerig | |
| 6,353,390 B1 | 3/2002 | Beri et al. | |
| 6,360,697 B1 | 3/2002 | Williams | |
| 6,360,698 B1 | 3/2002 | Stapelfeld et al. | |
| 6,404,338 B1 | 6/2002 | Koslar | |
| 6,415,742 B1 | 7/2002 | Lee et al. | |
| 6,426,464 B1 | 7/2002 | Spellman et al. | |
| 6,427,079 B1 | 7/2002 | Schneider et al. | |
| 6,431,121 B1 | 8/2002 | Mainini et al. | |
| 6,431,122 B1 | 8/2002 | Westrick et al. | |
| 6,441,778 B1 | 8/2002 | Durst et al. | |
| 6,459,378 B2 | 10/2002 | Gerig | |
| 6,487,992 B1 | 12/2002 | Hollis | |
| 6,561,137 B2 | 5/2003 | Oakman | |
| 6,581,546 B1 | 6/2003 | Dalland et al. | |
| 6,588,376 B1 | 7/2003 | Groh | |
| 6,598,563 B2 | 7/2003 | Kim et al. | |
| 6,600,422 B2 | 7/2003 | Barry et al. | |
| 6,637,376 B2 | 10/2003 | Lee et al. | |
| 6,657,544 B2 | 12/2003 | Barry et al. | |
| 6,668,760 B2 | 12/2003 | Groh et al. | |
| 6,700,492 B2 | 3/2004 | Touchton et al. | |
| 6,747,555 B2 | 6/2004 | Fellenstein et al. | |
| 6,798,887 B1 | 9/2004 | Andre | |
| 6,799,537 B1 | 10/2004 | Liao | |
| 6,807,720 B2 | 10/2004 | Brune et al. | |
| 6,820,025 B2 | 11/2004 | Bachmann et al. | |
| 6,825,768 B2 | 11/2004 | Stapelfeld et al. | |
| 6,830,012 B1 | 12/2004 | Swan | |
| 6,833,790 B2 | 12/2004 | Mejia et al. | |
| 6,874,447 B1 | 4/2005 | Kobett | |
| 6,888,502 B2 | 5/2005 | Beigel et al. | |
| 6,901,883 B2 | 6/2005 | Gillis et al. | |
| 6,903,682 B1 | 6/2005 | Maddox | |
| 6,907,844 B1 | 6/2005 | Crist et al. | |
| 6,907,883 B2 | 6/2005 | Lin | |
| 6,921,089 B2 | 7/2005 | Groh et al. | |
| 6,923,146 B2 | 8/2005 | Korbitz et al. | |
| 6,928,958 B2 | 8/2005 | Crist et al. | |
| 6,937,647 B1 | 8/2005 | Boyd et al. | |
| 6,956,483 B2 | 10/2005 | Schmitt et al. | |
| 6,970,090 B1 | 11/2005 | Sciarra | |
| 7,061,385 B2 | 6/2006 | Fong et al. | |
| 7,079,024 B2 | 7/2006 | Alarcon et al. | |
| 7,114,466 B1 | 10/2006 | Mayer | |
| 7,142,167 B2 | 11/2006 | Rochelle et al. | |
| 7,164,354 B1 | 1/2007 | Panzer | |
| 7,173,535 B2 | 2/2007 | Bach et al. | |
| 7,198,009 B2 | 4/2007 | Crist et al. | |
| 7,222,589 B2 | 5/2007 | Lee et al. | |
| 7,249,572 B2 | 7/2007 | Goetzl et al. | |
| 7,252,051 B2 | 8/2007 | Napolez et al. | |
| 7,259,718 B2 | 8/2007 | Patterson et al. | |
| 7,267,081 B2 | 9/2007 | Steinbacher | |
| 7,275,502 B2 | 10/2007 | Boyd et al. | |
| 7,296,540 B2 | 11/2007 | Boyd | |
| 7,319,397 B2 | 1/2008 | Chung et al. | |
| 7,328,671 B2 | 2/2008 | Kates | |
| 7,339,474 B2 * | 3/2008 | Easley | G08B 13/122 340/564 |
| 7,382,328 B2 | 6/2008 | Lee, IV et al. | |
| 7,394,390 B2 | 7/2008 | Gerig | |
| 7,395,966 B2 | 7/2008 | Braiman | |
| 7,403,744 B2 | 7/2008 | Bridgelall | |
| 7,404,379 B2 | 7/2008 | Nottingham et al. | |
| 7,411,492 B2 | 8/2008 | Greenberg et al. | |
| 7,426,906 B2 | 9/2008 | Nottingham et al. | |
| 7,434,541 B2 | 10/2008 | Kates | |
| 7,443,298 B2 | 10/2008 | Cole et al. | |
| 7,477,155 B2 | 1/2009 | Bach et al. | |
| 7,503,285 B2 | 3/2009 | Mainini et al. | |
| 7,518,275 B2 | 4/2009 | Suzuki et al. | |
| 7,518,522 B2 | 4/2009 | So et al. | |
| 7,538,679 B2 | 5/2009 | Shanks | |
| 7,546,817 B2 | 6/2009 | Moore | |
| 7,552,699 B2 | 6/2009 | Moore | |
| 7,559,291 B2 | 7/2009 | Reinhart | |
| 7,562,640 B2 | 7/2009 | Lalor | |
| 7,565,885 B2 | 7/2009 | Moore | |
| 7,574,979 B2 | 8/2009 | Nottingham et al. | |
| 7,583,931 B2 | 9/2009 | Eu et al. | |
| 7,602,302 B2 | 10/2009 | Hokuf et al. | |
| 7,612,668 B2 | 11/2009 | Harvey | |
| 7,616,124 B2 | 11/2009 | Paessel et al. | |
| 7,656,291 B2 | 2/2010 | Rochelle et al. | |
| 7,658,166 B1 | 2/2010 | Rheinschmidt, Jr. et al. | |
| 7,667,599 B2 | 2/2010 | Mainini et al. | |

(56) References Cited

U.S. PATENT DOCUMENTS

| | | |
|---|---|---|
| 7,667,607 B2 | 2/2010 | Gerig et al. |
| 7,680,645 B2 | 3/2010 | Li et al. |
| 7,705,736 B1 | 4/2010 | Kedziora |
| 7,710,263 B2 | 5/2010 | Boyd |
| 7,760,137 B2 | 7/2010 | Martucci et al. |
| 7,779,788 B2 | 8/2010 | Moore |
| 7,786,876 B2 | 8/2010 | Troxler et al. |
| 7,804,724 B2 | 9/2010 | Way |
| 7,814,865 B2 | 10/2010 | Tracy et al. |
| 7,828,221 B2 | 11/2010 | Kwon |
| 7,830,257 B2 | 11/2010 | Hassell |
| 7,834,769 B2 | 11/2010 | Hinkle et al. |
| 7,841,301 B2 | 11/2010 | Mainini et al. |
| 7,856,947 B2 | 12/2010 | Giunta |
| 7,864,057 B2 | 1/2011 | Milnes et al. |
| 7,868,912 B2 | 1/2011 | Venetianer et al. |
| 7,900,585 B2 | 3/2011 | Lee et al. |
| 7,918,190 B2 | 4/2011 | Belcher et al. |
| 7,944,359 B2 | 5/2011 | Fong et al. |
| 7,946,252 B2 | 5/2011 | Lee, IV et al. |
| 7,978,078 B2 | 7/2011 | Copeland et al. |
| 7,996,983 B2 | 8/2011 | Lee et al. |
| 8,011,327 B2 | 9/2011 | Mainini et al. |
| 8,047,161 B2 | 11/2011 | Moore et al. |
| 8,049,630 B2 | 11/2011 | Chao et al. |
| 8,065,978 B2 | 11/2011 | Duncan et al. |
| 8,069,823 B2 | 12/2011 | Mainini et al. |
| 8,098,164 B2 | 1/2012 | Gerig et al. |
| 8,159,355 B2 | 4/2012 | Gerig et al. |
| 8,161,915 B2 | 4/2012 | Kim |
| 8,185,345 B2 | 5/2012 | Mainini |
| 8,232,909 B2 | 7/2012 | Kroeger et al. |
| 8,240,085 B2 | 8/2012 | Hill |
| 8,269,504 B2 | 9/2012 | Gerig |
| 8,274,396 B2 | 9/2012 | Gurley et al. |
| 8,297,233 B2 | 10/2012 | Rich et al. |
| 8,342,134 B2 | 1/2013 | Lee et al. |
| 8,342,135 B2 | 1/2013 | Peinetti et al. |
| 8,430,064 B2 | 4/2013 | Groh et al. |
| 8,436,735 B2 | 5/2013 | Mainini et al. |
| 8,447,510 B2 | 5/2013 | Fitzpatrick et al. |
| 8,451,130 B2 | 5/2013 | Mainini |
| 8,456,296 B2 | 6/2013 | Piltonen et al. |
| 8,483,262 B2 | 7/2013 | Mainini et al. |
| 8,714,113 B2 | 5/2014 | Lee, IV et al. |
| 8,715,824 B2 * | 5/2014 | Rawlings ............... B32B 27/06 428/458 |
| 8,736,499 B2 | 5/2014 | Goetzl et al. |
| 8,779,925 B2 | 7/2014 | Rich et al. |
| 8,803,692 B2 | 8/2014 | Goetzl et al. |
| 8,807,089 B2 | 8/2014 | Brown et al. |
| 8,823,513 B2 | 9/2014 | Jameson et al. |
| 8,854,215 B1 | 10/2014 | Ellis et al. |
| 8,866,605 B2 | 10/2014 | Gibson |
| 8,908,034 B2 | 12/2014 | Bordonaro |
| 8,917,172 B2 | 12/2014 | Charych |
| 8,947,240 B2 | 2/2015 | Mainini |
| 8,967,085 B2 | 3/2015 | Gillis et al. |
| 9,035,773 B2 | 5/2015 | Petersen et al. |
| 9,125,380 B2 | 9/2015 | Deutsch |
| 9,131,660 B2 | 9/2015 | Womble |
| 9,186,091 B2 | 11/2015 | Mainini et al. |
| 9,204,251 B1 | 12/2015 | Mendelson et al. |
| 9,307,745 B2 | 4/2016 | Mainini |
| 9,516,863 B2 | 12/2016 | Gerig et al. |
| 9,861,076 B2 | 1/2018 | Rochelle et al. |
| 10,514,439 B2 | 12/2019 | Seltzer |
| 10,757,672 B1 | 8/2020 | Knas et al. |
| 2002/0010390 A1 | 1/2002 | Guice et al. |
| 2002/0015094 A1 | 2/2002 | Kuwano et al. |
| 2002/0036569 A1 | 3/2002 | Martin |
| 2002/0092481 A1 | 7/2002 | Spooner |
| 2002/0103610 A1 | 8/2002 | Bachmann et al. |
| 2002/0196151 A1 | 12/2002 | Troxler |
| 2003/0034887 A1 | 2/2003 | Crabtree et al. |
| 2003/0035051 A1 | 2/2003 | Cho et al. |
| 2003/0116099 A1 | 6/2003 | Kim et al. |
| 2003/0154928 A1 | 8/2003 | Lee et al. |
| 2003/0169207 A1 | 9/2003 | Beigel et al. |
| 2003/0179140 A1 | 9/2003 | Patterson et al. |
| 2003/0218539 A1 | 11/2003 | Hight |
| 2004/0108939 A1 | 6/2004 | Giunta |
| 2004/0162875 A1 | 8/2004 | Brown |
| 2004/0263322 A1 | 12/2004 | Onaru et al. |
| 2005/0000469 A1 | 1/2005 | Giunta et al. |
| 2005/0007251 A1 | 1/2005 | Crabtree et al. |
| 2005/0020279 A1 | 1/2005 | Markhovsky et al. |
| 2005/0035865 A1 | 2/2005 | Brennan et al. |
| 2005/0059909 A1 | 3/2005 | Burgess |
| 2005/0066912 A1 | 3/2005 | Korbitz et al. |
| 2005/0081797 A1 | 4/2005 | Laitinen et al. |
| 2005/0139169 A1 * | 6/2005 | So ................ A01K 15/023 119/721 |
| 2005/0145196 A1 | 7/2005 | Crist et al. |
| 2005/0145198 A1 | 7/2005 | Crist et al. |
| 2005/0145199 A1 | 7/2005 | Napolez et al. |
| 2005/0145200 A1 | 7/2005 | Napolez et al. |
| 2005/0148346 A1 | 7/2005 | Maloney et al. |
| 2005/0172912 A1 | 8/2005 | Crist et al. |
| 2005/0217606 A1 | 10/2005 | Lee et al. |
| 2005/0231353 A1 | 10/2005 | Dipoala et al. |
| 2005/0235924 A1 | 10/2005 | Lee et al. |
| 2005/0254663 A1 | 11/2005 | Raptopoulos et al. |
| 2005/0258715 A1 | 11/2005 | Schlabach et al. |
| 2005/0263106 A1 | 12/2005 | Steinbacher |
| 2005/0280544 A1 | 12/2005 | Mishelevich |
| 2005/0280546 A1 | 12/2005 | Ganley et al. |
| 2005/0288007 A1 | 12/2005 | Benco et al. |
| 2006/0000015 A1 | 1/2006 | Duncan |
| 2006/0011145 A1 | 1/2006 | Kates et al. |
| 2006/0027185 A1 | 2/2006 | Troxler et al. |
| 2006/0037559 A1 | 2/2006 | Belcher |
| 2006/0061469 A1 | 3/2006 | Jaeger et al. |
| 2006/0092676 A1 | 5/2006 | Liptak et al. |
| 2006/0102100 A1 | 5/2006 | Becker et al. |
| 2006/0102101 A1 | 5/2006 | Kim |
| 2006/0112901 A1 | 6/2006 | Gomez |
| 2006/0191491 A1 | 8/2006 | Nottingham et al. |
| 2006/0196445 A1 | 9/2006 | Kates |
| 2006/0197672 A1 | 9/2006 | Talamas, Jr. et al. |
| 2006/0202818 A1 | 9/2006 | Greenberg et al. |
| 2007/0011339 A1 | 1/2007 | Brown |
| 2007/0103296 A1 | 5/2007 | Paessel et al. |
| 2007/0197878 A1 | 8/2007 | Shklarski |
| 2007/0204803 A1 | 9/2007 | Ramsay |
| 2007/0204804 A1 | 9/2007 | Swanson et al. |
| 2007/0209604 A1 | 9/2007 | Groh et al. |
| 2007/0221138 A1 | 9/2007 | Mainini et al. |
| 2007/0249470 A1 | 10/2007 | Niva et al. |
| 2007/0266959 A1 | 11/2007 | Brooks et al. |
| 2008/0004539 A1 | 1/2008 | Ross |
| 2008/0017133 A1 | 1/2008 | Moore |
| 2008/0036610 A1 | 2/2008 | Hokuf et al. |
| 2008/0055154 A1 | 3/2008 | Martucci et al. |
| 2008/0055155 A1 | 3/2008 | Hensley et al. |
| 2008/0058670 A1 | 3/2008 | Mainini et al. |
| 2008/0061978 A1 | 3/2008 | Huang |
| 2008/0061990 A1 | 3/2008 | Milnes et al. |
| 2008/0119757 A1 | 5/2008 | Winter |
| 2008/0129457 A1 | 6/2008 | Ritter et al. |
| 2008/0141949 A1 | 6/2008 | Taylor |
| 2008/0143516 A1 | 6/2008 | Mock et al. |
| 2008/0156277 A1 | 7/2008 | Mainini et al. |
| 2008/0163827 A1 | 7/2008 | Goetzl |
| 2008/0163829 A1 | 7/2008 | Lee et al. |
| 2008/0168949 A1 | 7/2008 | Belcher et al. |
| 2008/0168950 A1 | 7/2008 | Moore et al. |
| 2008/0186167 A1 | 8/2008 | Ramachandra |
| 2008/0186197 A1 | 8/2008 | Rochelle et al. |
| 2008/0204322 A1 | 8/2008 | Oswald et al. |
| 2008/0216766 A1 | 9/2008 | Martin et al. |
| 2008/0236514 A1 | 10/2008 | Johnson et al. |
| 2008/0252527 A1 | 10/2008 | Garcia |
| 2008/0272908 A1 | 11/2008 | Boyd |

(56) References Cited

U.S. PATENT DOCUMENTS

| | | |
|---|---|---|
| 2009/0000566 A1 | 1/2009 | Kim |
| 2009/0002188 A1 | 1/2009 | Greenberg |
| 2009/0012355 A1 | 1/2009 | Lin |
| 2009/0020002 A1 | 1/2009 | Williams et al. |
| 2009/0025651 A1 | 1/2009 | Lalor |
| 2009/0031966 A1 | 2/2009 | Kates |
| 2009/0061772 A1 | 3/2009 | Moon et al. |
| 2009/0082830 A1 | 3/2009 | Folkerts et al. |
| 2009/0102668 A1 | 4/2009 | Thompson et al. |
| 2009/0112284 A1 | 4/2009 | Smith et al. |
| 2009/0129338 A1 | 5/2009 | Horn et al. |
| 2009/0224909 A1 | 9/2009 | Derrick et al. |
| 2009/0239586 A1 | 9/2009 | Boeve et al. |
| 2009/0289785 A1 | 11/2009 | Leonard |
| 2009/0289844 A1 | 11/2009 | Palsgrove et al. |
| 2009/0299742 A1 | 12/2009 | Toman et al. |
| 2010/0008011 A1* | 1/2010 | Ogram ............... H01Q 1/28 |
| | | 361/222 |
| 2010/0019903 A1 | 1/2010 | Sawaya |
| 2010/0033339 A1 | 2/2010 | Gurley et al. |
| 2010/0047119 A1 | 2/2010 | Cressy |
| 2010/0049364 A1 | 2/2010 | Landry et al. |
| 2010/0050954 A1 | 3/2010 | Lee, IV et al. |
| 2010/0107985 A1 | 5/2010 | O'Hare |
| 2010/0139576 A1 | 6/2010 | Kim et al. |
| 2010/0154721 A1 | 6/2010 | Gerig et al. |
| 2010/0201525 A1 | 8/2010 | Bahat et al. |
| 2010/0231391 A1 | 9/2010 | Dror et al. |
| 2010/0238022 A1 | 9/2010 | Au et al. |
| 2010/0315241 A1 | 12/2010 | Jow |
| 2010/0321180 A1 | 12/2010 | Dempsey et al. |
| 2011/0140967 A1 | 6/2011 | Lopez |
| 2011/0182438 A1 | 7/2011 | Koike et al. |
| 2011/0203529 A1 | 8/2011 | Mainini et al. |
| 2012/0000431 A1 | 1/2012 | Khoshkish et al. |
| 2012/0006282 A1 | 1/2012 | Kates |
| 2012/0032855 A1 | 2/2012 | Reede et al. |
| 2012/0037088 A1 | 2/2012 | Altenhofen |
| 2012/0078139 A1 | 3/2012 | Aldridge et al. |
| 2012/0087204 A1 | 4/2012 | Urbano et al. |
| 2012/0132151 A1 | 5/2012 | Touchton et al. |
| 2012/0165012 A1 | 6/2012 | Fischer et al. |
| 2012/0188370 A1 | 7/2012 | Bordonaro |
| 2012/0236688 A1* | 9/2012 | Spencer ................ G01V 1/30 |
| | | 367/117 |
| 2012/0312250 A1 | 12/2012 | Jesurum |
| 2013/0099920 A1 | 4/2013 | Song et al. |
| 2013/0099922 A1 | 4/2013 | Lohbihler |
| 2013/0141237 A1 | 6/2013 | Goetzl et al. |
| 2013/0157564 A1 | 6/2013 | Curtis et al. |
| 2013/0169441 A1 | 7/2013 | Wilson |
| 2013/0203027 A1 | 8/2013 | De Villers-Sidani et al. |
| 2013/0298846 A1 | 11/2013 | Mainini |
| 2013/0321159 A1 | 12/2013 | Schofield et al. |
| 2013/0340305 A1 | 12/2013 | Mobley |
| 2014/0020635 A1 | 1/2014 | Sayers et al. |
| 2014/0053788 A1 | 2/2014 | Riddell |
| 2014/0057232 A1 | 2/2014 | Wetmore et al. |
| 2014/0062695 A1 | 3/2014 | Rosen et al. |
| 2014/0069350 A1 | 3/2014 | Riddell |
| 2014/0073939 A1 | 3/2014 | Rodriguez-Llorente et al. |
| 2014/0120943 A1 | 5/2014 | Shima |
| 2014/0123912 A1 | 5/2014 | Menkes et al. |
| 2014/0132608 A1 | 5/2014 | Mund et al. |
| 2014/0174376 A1 | 6/2014 | Touchton et al. |
| 2014/0176305 A1 | 6/2014 | Aljadeff |
| 2014/0228649 A1 | 8/2014 | Rayner et al. |
| 2014/0228927 A1 | 8/2014 | Ahmad et al. |
| 2014/0253368 A1 | 9/2014 | Holder |
| 2014/0253389 A1 | 9/2014 | Beauregard |
| 2014/0261234 A1 | 9/2014 | Gillis et al. |
| 2014/0261235 A1 | 9/2014 | Rich et al. |
| 2014/0265568 A1 | 9/2014 | Crafts et al. |
| 2014/0267299 A1 | 9/2014 | Couse |
| 2014/0275824 A1 | 9/2014 | Couse et al. |
| 2014/0276278 A1 | 9/2014 | Smith et al. |
| 2014/0307888 A1 | 10/2014 | Alderson et al. |
| 2014/0320347 A1* | 10/2014 | Rochelle ............... A01K 15/023 |
| | | 342/385 |
| 2014/0343599 A1 | 11/2014 | Smith et al. |
| 2014/0358592 A1 | 12/2014 | Wedig et al. |
| 2015/0040840 A1 | 2/2015 | Muetzel et al. |
| 2015/0043744 A1 | 2/2015 | Lagodzinski et al. |
| 2015/0053144 A1 | 2/2015 | Bianchi et al. |
| 2015/0075446 A1 | 3/2015 | Hu |
| 2015/0080013 A1 | 3/2015 | Venkatraman et al. |
| 2015/0107531 A1 | 4/2015 | Golden |
| 2015/0149111 A1 | 5/2015 | Kelly et al. |
| 2015/0163412 A1 | 6/2015 | Holley et al. |
| 2015/0172872 A1 | 6/2015 | Alsehly et al. |
| 2015/0173327 A1 | 6/2015 | Gerig et al. |
| 2015/0199490 A1 | 7/2015 | Iancu et al. |
| 2015/0223013 A1 | 8/2015 | Park et al. |
| 2015/0289111 A1 | 10/2015 | Ozkan et al. |
| 2015/0350848 A1 | 12/2015 | Eramian |
| 2015/0358768 A1 | 12/2015 | Luna et al. |
| 2016/0015005 A1 | 1/2016 | Brown, Jr. et al. |
| 2016/0021506 A1 | 1/2016 | Bonge, Jr. |
| 2016/0021850 A1 | 1/2016 | Stapelfeld et al. |
| 2016/0029466 A1* | 1/2016 | DeMao ............... G01R 31/382 |
| | | 307/43 |
| 2016/0044444 A1 | 2/2016 | Rattner et al. |
| 2016/0084801 A1 | 3/2016 | Robinson et al. |
| 2016/0094419 A1 | 3/2016 | Peacock et al. |
| 2016/0102879 A1 | 4/2016 | Guest et al. |
| 2016/0125867 A1 | 5/2016 | Jarvinen et al. |
| 2016/0150362 A1 | 5/2016 | Shaprio et al. |
| 2016/0174099 A1 | 6/2016 | Goldfain |
| 2016/0178392 A1 | 6/2016 | Goldfain |
| 2016/0187454 A1 | 6/2016 | Orman et al. |
| 2016/0234649 A1 | 8/2016 | Finnerty et al. |
| 2016/0253987 A1 | 9/2016 | Chattell |
| 2016/0292635 A1 | 10/2016 | Todasco |
| 2016/0335917 A1 | 11/2016 | Lydecker et al. |
| 2016/0363664 A1 | 12/2016 | Mindell et al. |
| 2016/0366813 A1* | 12/2016 | Haneda ................ A01G 25/09 |
| 2017/0026798 A1 | 1/2017 | Prevatt |
| 2017/0212205 A1 | 7/2017 | Bialer et al. |
| 2017/0323630 A1 | 11/2017 | Stickney et al. |
| 2018/0027772 A1* | 2/2018 | Gordon ............... G05D 1/104 |
| 2018/0077509 A1 | 3/2018 | Jones et al. |
| 2018/0078735 A1 | 3/2018 | Dalgleish et al. |
| 2018/0094451 A1* | 4/2018 | Peter ..................... F41H 11/08 |
| 2018/0188351 A1 | 7/2018 | Jones et al. |
| 2018/0190311 A1 | 7/2018 | Kato et al. |
| 2018/0210704 A1 | 7/2018 | Jones et al. |
| 2018/0234134 A1 | 8/2018 | Tang et al. |
| 2018/0235182 A1 | 8/2018 | Bocknek |
| 2018/0249680 A1 | 9/2018 | Van Curen et al. |
| 2018/0303066 A1 | 10/2018 | Bai et al. |
| 2018/0315262 A1 | 11/2018 | Love et al. |
| 2019/0013003 A1 | 1/2019 | Baughman et al. |
| 2019/0066651 A1 | 2/2019 | Yang |
| 2019/0110430 A1* | 4/2019 | Badiou ................ A01K 5/0275 |
| 2019/0165832 A1 | 5/2019 | Khanduri et al. |
| 2020/0367810 A1 | 11/2020 | Shouldice et al. |

FOREIGN PATENT DOCUMENTS

| | | | |
|---|---|---|---|
| CN | 101937015 A | * | 1/2011 |
| CN | 101112181 B | | 11/2012 |
| CN | 102793568 B | | 12/2014 |
| JP | H0974774 A | | 3/1997 |
| KR | 20130128704 A | | 11/2013 |
| KR | 20180029636 A | | 3/2018 |
| KR | 20180059684 A | | 6/2018 |
| KR | 101911312 B1 | | 1/2019 |
| WO | WO-02060240 A3 | | 2/2003 |
| WO | WO-2006000015 A1 | | 1/2006 |
| WO | WO-2008085812 A2 | | 7/2008 |
| WO | WO-2008140992 A1 | | 11/2008 |
| WO | WO-2009105243 A2 | | 8/2009 |
| WO | WO-2009106896 A2 | | 9/2009 |
| WO | WO-2011055004 A1 | | 5/2011 |

(56) References Cited

FOREIGN PATENT DOCUMENTS

| WO | WO-2011136816 A1 | 11/2011 |
|---|---|---|
| WO | WO-2011160698 A1 | 12/2011 |
| WO | WO-2012122607 A1 | 9/2012 |
| WO | WO-2015015047 A1 | 2/2015 |
| WO | WO-2016204799 A1 | 12/2016 |

OTHER PUBLICATIONS

Baba A.I., et al., "Calibrating Time of Flight in Two Way Ranging," IEEE Xplore Digital Library, Dec. 2011, pp. 393-397.
Extended European Search Report for European Application No. 11784149.4 dated Nov. 17, 2017, 7 pages.
Extended European Search Report for European Application No. 15735439.0 dated Oct. 18, 2017, 9 pages.
Extended European Search Report for European Application No. 15895839.7 dated Oct. 9, 2018, 5 pages.
Extended European Search Report for European Application No. 17162289.7 dated Aug. 31, 2017, 7 pages.
High Tech Products, Inc: "Human Contain Model X-10 Rechargeable Muti-function Electronic Dog Fence Ultra-system", Internet citation, Retrieved from the Internet: URL:http://web.archive.org/web/20120112221915/http://hightechpet.com/user_Manuals/HC%20X-10_Press.pdf retrieved on Apr. 10, 2017], Apr. 28, 2012, pp. 1-32, XP008184171.
International Preliminary Report for Patentability Chapter II for International Application No. PCT/US2014/024875 dated Mar. 12, 2015, 17 pages.
International Preliminary Report on Patentability for Application No. PCT/US2015/043653 dated Dec. 19, 2017, 14 pages.
International Search Report and Written Opinion for Application No. PCT/US2018/013737 dated Mar. 7, 2018, 8 pages.
International Search Report and Written Opinion for Application No. PCT/US2018/013738 dated Mar. 20, 2018, 6 pages.
International Search Report and Written Opinion for Application No. PCT/US2018/013740 dated Mar. 20, 2018, 6 pages.
International Search Report and Written Opinion for Application No. PCT/US2018/019887 dated May 8, 2018, 10 pages.
International Search Report and Written Opinion for International Application No. PCT/US2014/024875 dated Jun. 27, 2014, 12 pages.
International Search Report for International Application No. PCT/US2014/020344 dated Jun. 5, 2014, 2 pages.
International Search Report for International Application No. PCT/US2014/066650 dated Feb. 19, 2015, 3 pages (Outgoing).
International Search Report for International Application No. PCT/US2015/010864, Form PCT/ISA/210 dated Apr. 13, 2015, 2 pages.
International Search Report for International Application No. PCT/US2015/043653, Form PCT/ISA/210 dated Oct. 23, 2015, 2 pages.
Notification of Transmittal of the International Search Report and the Written Opinion of the International Searching Authority for International Application No. PCT/US2015/043653, Form PCT/ISA/220 dated Oct. 23, 2015, 1 page.
Notification of Transmittal of the International Search Report and Written Opinion for the International Application No. PCT/US2014/066650 dated Feb. 19, 2015, 1 page.
Welch et al., "An Introduction to the Kalman Filter," Department of Computer Science, Jul. 24, 2006, pp. 1-16.
Written Opinion for International Application No. PCT/US2014/066650 dated Feb. 19, 2015, 15 pages(outgoing).

Written Opinion for International Application No. PCT/US2015/043653, Form PCT/ISA/237 dated Oct. 23, 2015, 13 pages.
Written Opinion of the International Application No. PCT/US2015/010864, Form PCT/ISA/237 dated Apr. 13, 2015, 6 pages.
Eileen—How To Protect Your Dog From Loud and Scary Sounds (Year: 2013).
Extended European Search Report for European Application No. 18738816 dated Sep. 29, 2020, 10 pages.
Extended European Search Report for European Application No. 18738547.1 dated Sep. 24, 2020, 9 pages.
Extended European Search Report for European Application No. 18738743.6 dated Sep. 24, 2020, 11 pages.
Info Unlimited "Canine 10RC-HP10 Instructions"; Instruction manual V.0420; Publication 12 & 15 [online]. Jun. 14, 2013 (retrieved Sep. 29, 2020]. Retrieved from the Internet: URL:https://www.amazing1.com/content/download/CANINE10_Instructions.pdf.
Info Unlimited "Canine 10RC-HP10 Instructions"; Instruction manual V.0420. [Retrieved on Jul. 8, 2017]. Retrieved from the Internet: URL:https://www.amazing1.com/content/download/CANINE10_Instructions.pdf.
International Search Report and Written Opinion for Application No. PCT/US2020/042601 dated Nov. 9, 2020, 11 pages.
International Search Report and Written Opinion for Application No. PCT/US2018/065122, dated Mar. 25, 2019, 7 pages.
International Search Report and Written Opinion for Application No. PCT/US2018/065154 dated Apr. 23, 2019, 7 pages.
International Search Report and Written Opinion for Application No. PCT/US2018/065938, dated Mar. 8, 2019, 9 pages.
International Search Report and Written Opinion for Application No. PCT/US2020/016617, dated Apr. 27, 2020, 13 pages.
Jondhale et al., Issues and challenges in RSSI based target localization and tracking in wireless sensor networks (Year: 2016).
Joshi et al., GPS-less animal tracking system (Year: 2008).
Kuo et al., Detecting Movement of Beacons in Location-Tracking Wireless Sensor Networks (Year: 2007).
Kuo et al., The Beacon Movement Detection Problem in Wireless Sensor Networks for Localization Applications (Year: 2009).
Millner et al., Wireless 3D Localization of Animals for Trait and Behavior Analysis in Indoor & Outdoor Areas (Year: 2009).
Panicker et al., A LoRa Wireless Mesh Network for Wide-Area Animal Tracking (Year: 2019).
Ayele E., et al., "Highly Energy Efficient Animal Mobility Driven BLE Beacon Advertising Control for Wildlife Monitoring," IEEE Xplore, 2020, 8 pages.
Crutchfield., "What You Need to Know About Sound Masking," pp. 1-7.
Integrated Building System., "The What, Where, Why and How of Sound Masking," 2016, 6 pages.
Nam M., et al., "Combined Scheduling of Sensing and Communication for Real-Time Indoor Tracking in Assisted Living," IEEE Real Time System Symposium, 2007, 10 pages.
Radoi I.E., et al., "Tracking and Monitoring Horses in the Wild Using Wireless Sensor Networks," IEEE International Conference on Wireless and Mobile Computing, Networking and Communications, 2015, 8 pages.
Supplementary European Search Report for European Application No. 18887374.9, dated Aug. 10, 2021, 7 pages.
Supplementary European Search Report for European Application No. 18888089.2, dated Aug. 6, 2021, 6 pages.
Supplementary European Search Report for European Application No. 18889799.5, dated Aug. 13, 2021, 10 pages.
Wood D.J., "Speech Privacy & Sound Masking in Modern Architecture," 2008, 51 pages.

* cited by examiner

INTERACTIVE APPLICATION TO PROTECT PET CONTAINMENT SYSTEMS FROM EXTERNAL SURGE DAMAGE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Pet containment systems often include a boundary wire which determines a perimeter of a containment area. The boundary wire is generally buried beneath the surface of the ground and establishes a boundary in the form of an electrical field. A transceiver worn by an animal interacts with the electrical field to provide the animal a stimulus to encourage the animal to stay within the containment area. However, lightning may strike the boundary wire. There is a need to protect system components coupled to the boundary wire from lightning strike electrical surges.

FIELD OF THE INVENTION

The present disclosure relates to systems and methods for providing surge protection with respect to pet containment systems comprising a boundary loop wire.

BRIEF DESCRIPTION OF THE DRAWINGS

So that the manner in which the present application can be better understood, certain illustrations and figures are appended hereto. It is to be noted, however, that the drawings illustrate only selected embodiments and elements of systems and methods for providing surge protection with respect to pet containment systems and are therefore not to be considered limiting in scope for the systems and methods for providing surge protection with respect to pet containment systems as described herein may admit to other equally effective embodiments and applications.

DETAILED DESCRIPTION

A number of systems have been developed to provide means for containing pets within a certain predefined area. An embodiment of an outdoor containment system as further described in U.S. Pat. No. 8,047,161 provides an animal containment system for containing an animal within a boundary, for maximizing the animal's usable area within the boundary, and for not discouraging the animal from returning to within the boundary in the event the animal moves beyond the boundary.

Figure 1:
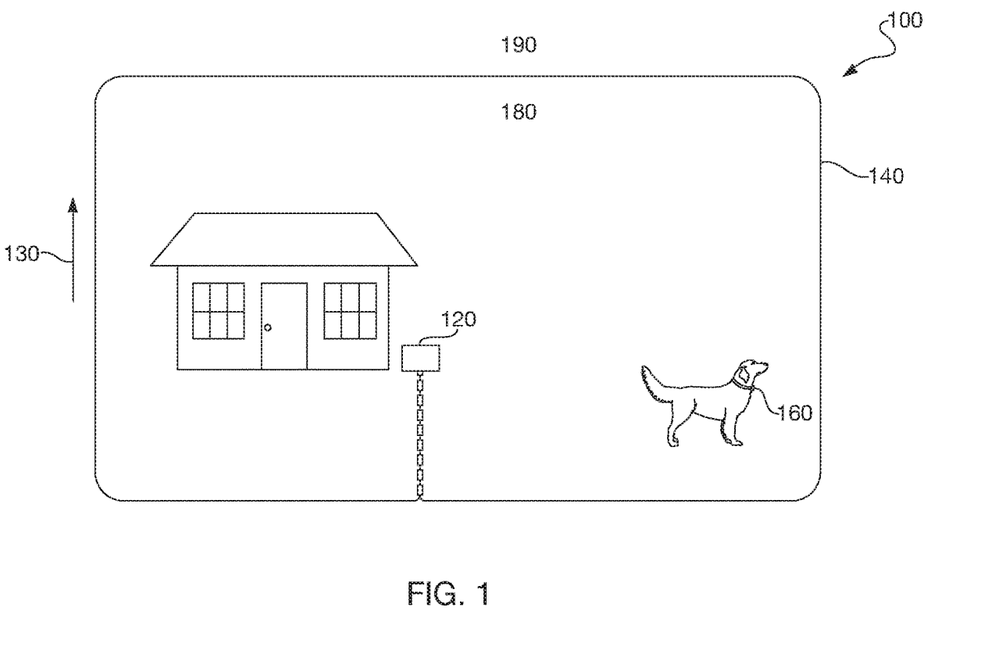
FIG. 1 shows an animal containment system, under an embodiment.

The animal containment system 100 of FIG. 1 includes a signal generator 120, a wire 140, and a collar unit 160. The signal generator 120 is in electrical communication with the wire 140 and in wireless communication with the collar unit 160. The wire 140 defines a boundary, which defines an area within the boundary 180 and an area beyond the boundary 190. In the illustrated embodiment, the wire 140 defines the perimeter of a residential yard such that the perimeter of the yard is the boundary, the yard is the area within the boundary 180, and the area outside the yard is the area beyond the boundary 190. Those skilled in the art will recognize that the wire 140 can define a boundary other than the perimeter of a residential yard without departing from the scope and spirit of the present disclosure. In one embodiment, the wire 140 is buried in the ground such that the wire 140 is not visible from the surface of the ground. The collar unit 160 is carried by the animal. In the illustrated embodiment, the collar unit 160 is mounted to an animal collar and the collar is secured to the animal such that the animal carries the collar unit 160. Those skilled in the art will recognize that the collar unit 160 can be carried by the animal by ways other than an animal collar without departing from the scope or spirit of the present disclosure.

Figure 2:
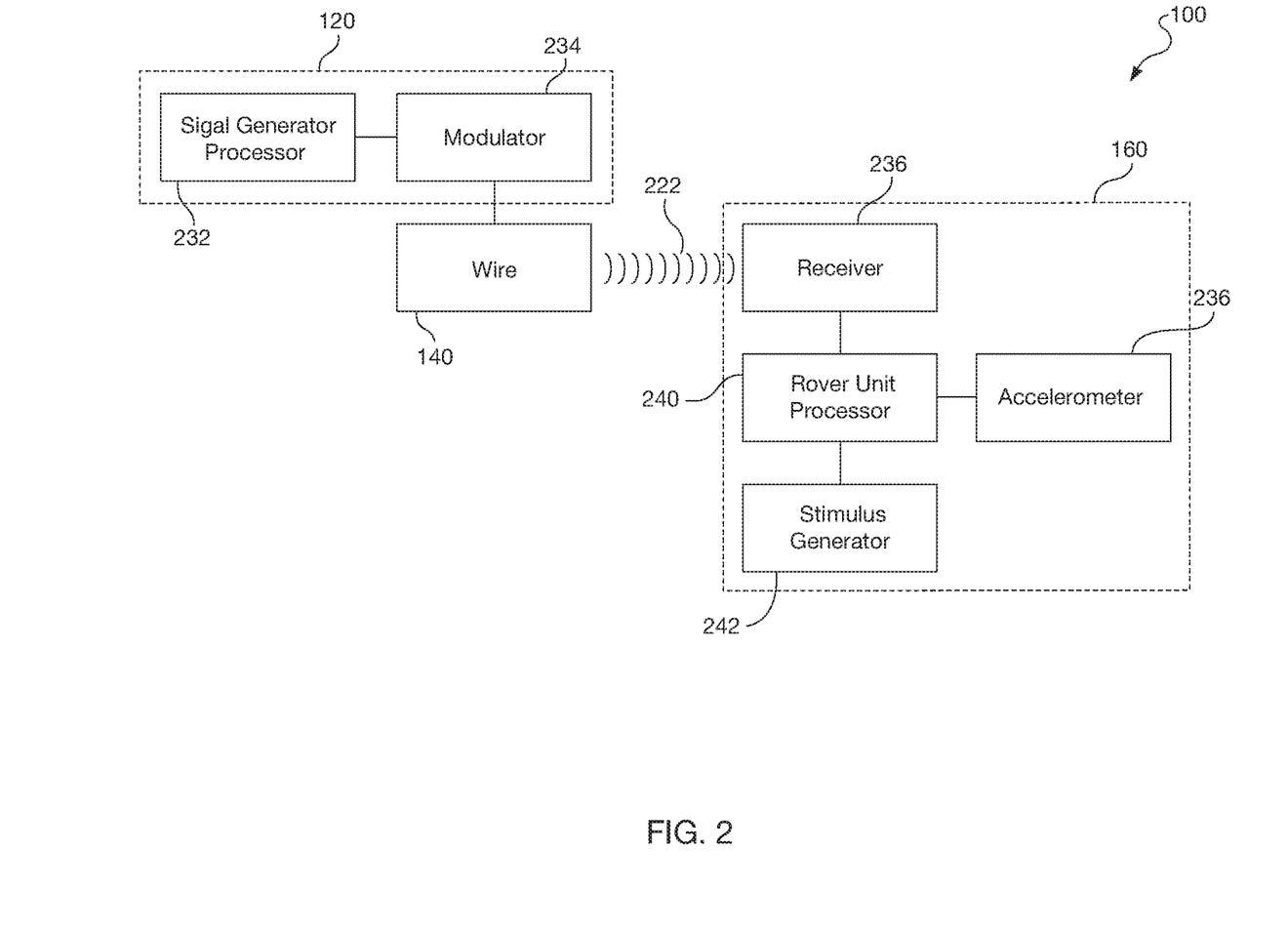
FIG. 2 shows a signal generator in communication with a collar unit, under an embodiment.

FIG. 2 is a block diagram of one embodiment of the animal containment system 100 in accordance with the various features of the present embodiment. In the illustrated embodiment, the signal generator 120 includes a signal generator processor 232 and a modulator 234, whereby the signal generator processor 232 is in electrical communication with the modulator 234. The signal generator processor 232 generates a digital activation signal 222 which may be modulated by, modulator 234.

Figure 3:
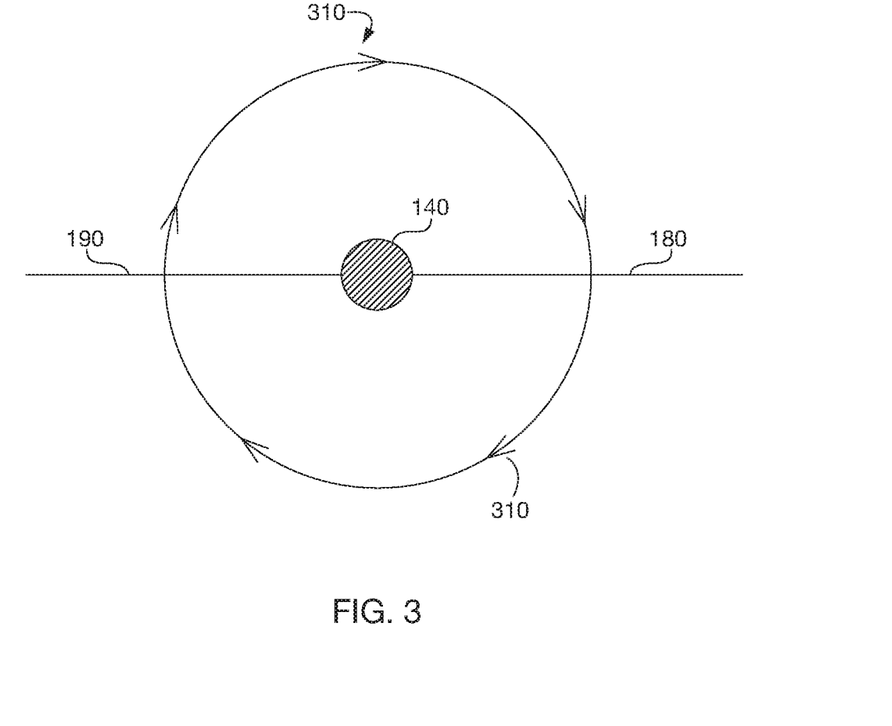
FIG. 3 shows current flowing through a boundary loop wire, under an embodiment.

After modulating the activation signal 222, the signal generator 120 wirelessly transmits the activation signal 222 by way of the wire 140. More specifically, the signal generator 120 drives current through the wire 140 such that the activation signal 222 radiates from the wire 140 in the form of a magnetic field. In the illustrated embodiment of FIG. 1, the signal generator 120 drives current through the wire 140 in the direction indicated by the arrow at 130. FIG. 3 illustrates a cross-sectional view of the wire 140 whereby the direction of current in the wire is into the page. Because the direction of the current driven through the wire 140 is into the page, the resulting magnetic field rotates about the wire 140 in the direction indicated by the arrow at 310. Consequently, the polarity of the activation signal 222 within the boundary 180 is substantially opposite the polarity of the activation signal 222 beyond the boundary 190. It should be noted that an alternating circuit power source may drive periodic carrier cycles onto the line. However, the receiver may detect the polarity of a first carrier wave (with positive direction) of each modulated section. Therefore, FIG. 3 shows a single direction uniform field with a polarity within the boundary substantially opposite the polarity outside the boundary.

Under another embodiment of a containment system, a wire is laid out on the ground or buried a short distance beneath the surface of the ground along a perimeter of a boundary area. The boundary wire may then be connected to a transmitter system (signal generator). Under an embodiment, the transmitter system (signal generator) sets up an electrical field in the wire which determines the boundary of the unit. The pet wears a collar which includes a receiver and a stimulus system for providing a stimulus to the pet when the pet moves too close to the wire. Under an embodiment, the collar contains two stimuli applications, one to provide an audio warning to tell the pet that it is approaching the boundary and another to apply a stimulus to further warn the pet that it is too close to the boundary.

Another example of a pet containment system may be found in U.S. Pat. No. 3,753,421 issued on Aug. 21, 1973 to Peck. Each US patent or patent application publication referenced in this application is incorporated herein by reference as if set forth herein in its entirety.

Pet containment systems may be damaged due to incoming surges on the loop wire attributable to lightning strikes. These surges may cause failure of containment system components. Lightning strikes may also generate transient voltages on a home's electrical system causing damage to other electrical devices. In rare circumstances, electrical surges may cause a structure to catch fire.

Lightning discharge devices, or lightning arrestors, may be placed to mitigate surge damage to pet containment system components and in home electrical devices. These discharge devices work for a majority of surges entering the containment system transmitter via the loop wire. However, discharge devices require time to react and may only handle so much current. What is needed are systems, methods and/or devices that monitor the movement of electrical storms or electrical storm activity in a specific area in order to anticipate potential electrical strikes. These protective systems, methods and/or devices may disconnect the loop wire from the pet containment transmitter when an imminent strike is expected.

An electronic pet containment transmitter system comprises a signal generator (control panel), power supply and a boundary loop wire. The signal generator is under one embodiment connected to the boundary loop wire. The signal generator provides an encoded electrical current to the boundary loop wire that is buried along the perimeter of a boundary area. The signal generator that provides current to the boundary loop wire also receives current from the boundary loop wire generated by transient surges from nearby lightning strikes. The signal generator utilizes under an embodiment various components on-board to dissipate low current surges that reach the signal generator circuit. Additionally, an external lightning arrestor may be used to divert surge current entering the signal generator via the boundary loop wire. Although effective, the boundary loop wire remains physically connected to the signal generator leaving the possibility that high current surges may cause damage to all inline components.

In order to further mitigate damage to the signal generator and/or lightning arrestor, the boundary loop wire is under an embodiment electrically disconnected from all components in the containment system. This decoupling requires under one embodiment an additional disconnect device 412, 418 wired along the boundary loop 420 between the signal generator 408 and the lightning arrestor 416 or between the boundary loop 420 and the lightning arrestor 416 as shown in FIG. 4B. Note that FIG. 4B shows disconnect device 412, 418 in two location. Such disconnect device 412, 418 may be in location 412 or location 418 but not both. The remaining disclosure refers to both disconnect devices 412, 418 together as a matter of convenience.

The disconnect device functions under an embodiment to keep electrical surges away from the sensitive components of the signal generator.

A disconnect device may include some or all of the following components and/or features.

a communicative coupling via cabling or RE communication to a network that provides a signal triggering a disconnect;
  a high voltage relay to disconnect the boundary loop wire from the signal generator;
  a second relay to close the open boundary loop circuit to defeat the signal generator's wire break alert; a high voltage relay disconnects the boundary loop wire and a second small signal relay bridges the loop wires at the disconnect device to defeat the signal generator's break alert.
  electrical coupling between the disconnect device and battery backup 410 in the event of a power loss situation;
  onboard or tethered lightning sensor (similar to AS3935 Franklin Lightning Sensor by Austria Microsystems) as a backup lighting indicator in the event of power loss or ineffective control data provided by a custom software application (as further described below); and a
  power source comprising a transmitter's battery backup (BBU) 410, i.e. the disconnect device is powered by the battery backup (BBU) in the event of power loss.

FIG. 4B shows a signal generator 408 that is coupled to a boundary loop wire 420 under one embodiment. The signal generator 408 of an embodiment is connected to a power supply 414. The power supply 414 may comprise a standard 120 volt 60 Hz supply. The signal generator 408 is connected to a battery backup 410 in the event of a power loss situation. The battery backup 410 may under one embodiment be recharged through the signal generator powered by primary power source 414. The signal generator 408 may be directly connected or coupled to a lightning arrestor 416 (depending on location of disconnect device). As already described above, a lightning arrestor 416 may mitigate surge damage to pet containment system components and in home electrical devices. These discharge devices work for a majority of surges entering the containment system transmitter via the loop wire. However, discharge devices require time to react and may only handle so much current.

A disconnect device 412, 418 provides an additional layer of protection. FIG. 4B shows a disconnect device 412, 418 placed either (i) between signal generator 408 and lightning arrestor 416 or (ii) between lightning arrestor 416 and boundary loop wire 420. In either case, the disconnect device operates to decouple the boundary loop wire and the signal generator. The disconnect device comprises a first high voltage relay to disconnect the boundary loop wire from the signal generator. The disconnect device comprises a second relay to close the open boundary loop circuit to defeat the signal generator's wire break alert. In other words, the first relay performs the disconnect while the second relay bridges the loop wires at the disconnect device. Under an embodiment, the second relay provides an electrical pathway between loop wire terminals of a disconnect device. In other words, the second relay "fools" the signal generator into believing that the boundary loop wire is operational thereby defeating the signal generator's wire break alert.

Figure 5:
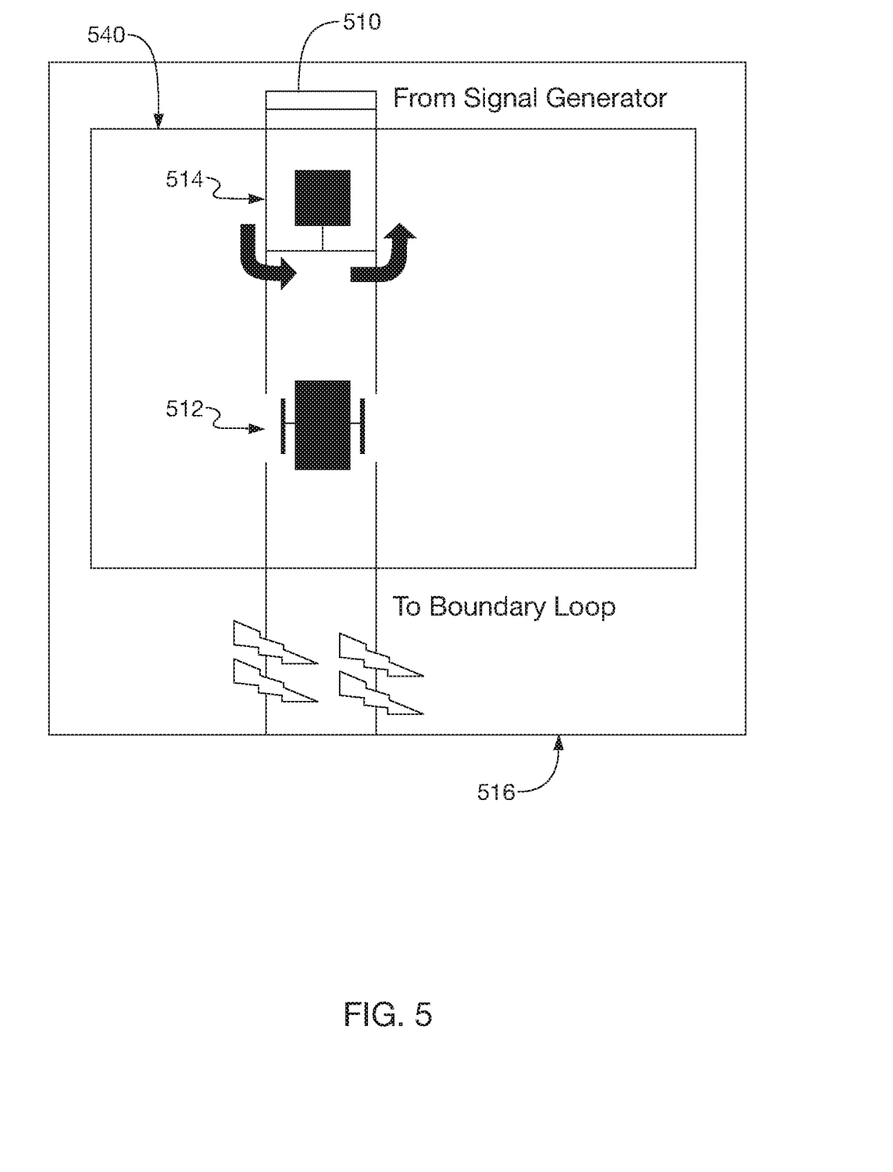
FIG. 5 shows components of a disconnect device, under an embodiment.

FIG. 5 shows the components of disconnect device 540 under an embodiment. FIG. 5 shows that current flows from signal generator 510 through disconnect device 540 and to boundary loop 516. A high voltage relay 512 of disconnect device 540 operates to disconnect the loop wire 516 from signal generator 510. Another small signal relay 514 of the disconnect device 540 then operates to close the open boundary loop circuit to defeat the signal generator's break alert.

Figure 4A:
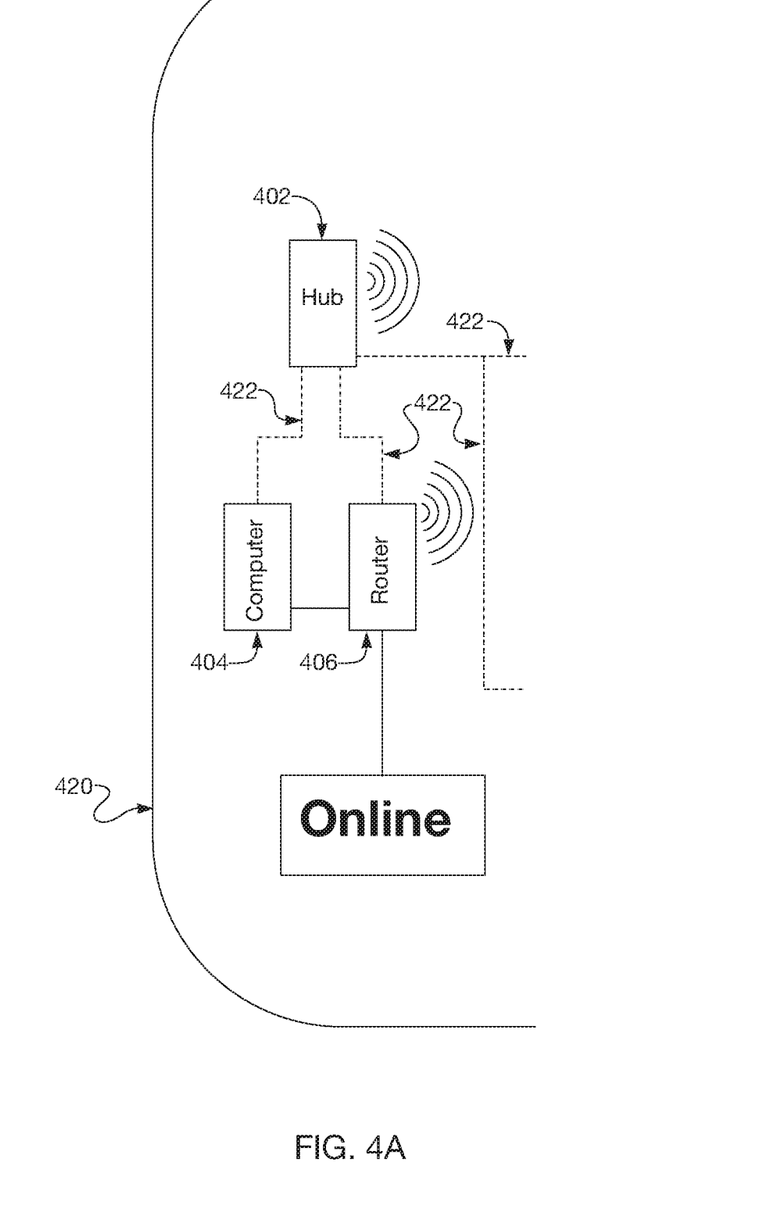
FIG. 4A shows components of a lightning strike surge protection system, under an embodiment.
Figure 4B:
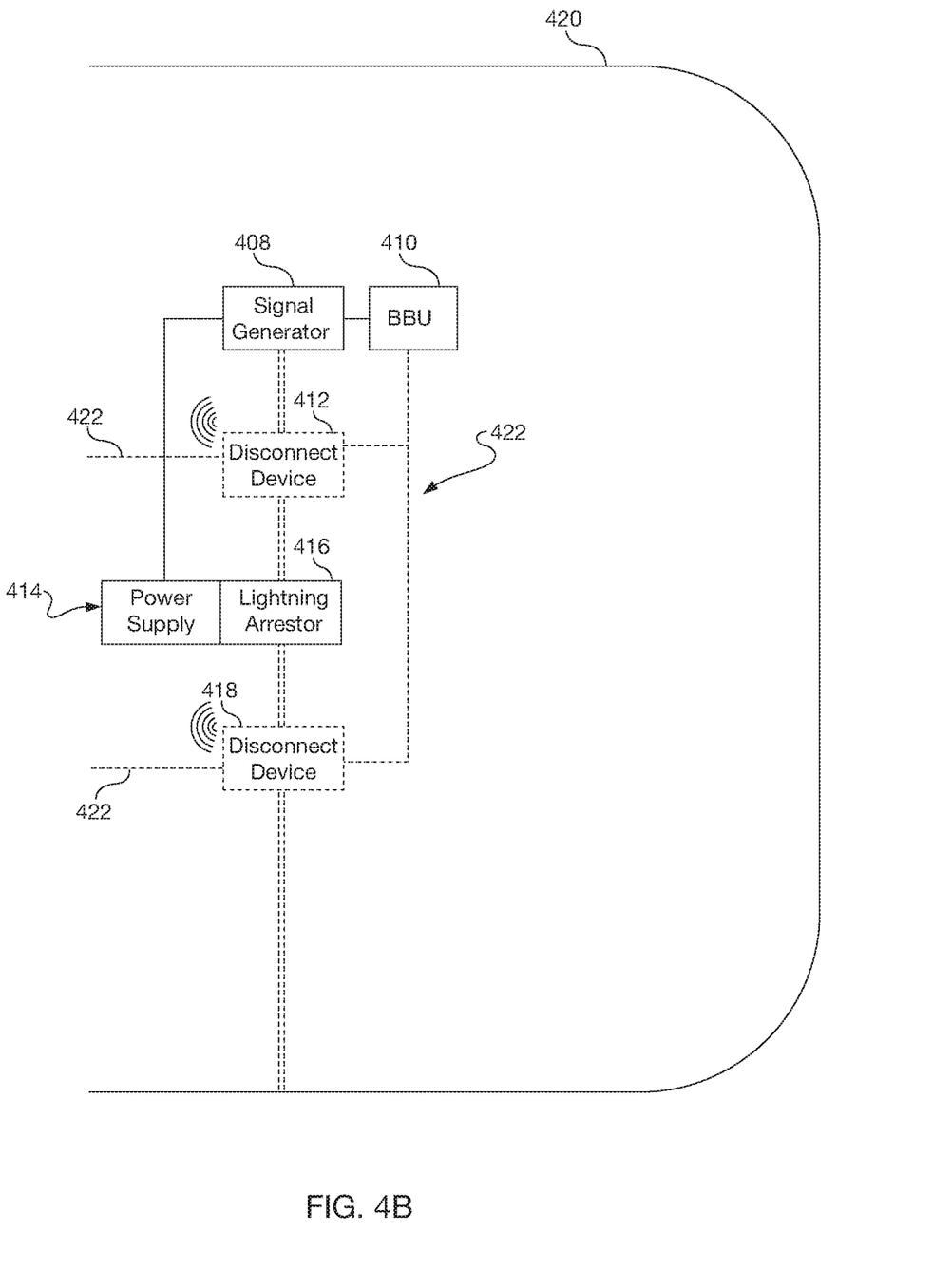
FIG. 4B shows components of a lightning strike surge protection system, under an embodiment.

FIGS. 4A and 4B show that a disconnect device 412, 418 is communicatively coupled with computer 404, hub 402, and router 406 via network 422. The network 422 may comprise one or more of a Wired Local Area Network (LAN), a Wireless Local Area Network (WLAN), or a Wireless Personal Area Network (\WAN). FIG. 4A shows a computer 404 communicatively coupled with router 406 and hub 402 through network 422. The local router 406 is further coupled to the internet providing internet connectivity to both the router 406, hub 402, computer 404, and disconnect device 412, 418.

The network 422 shown in FIGS. 4A and 4B may comprise a wired Local Area Network under one embodiment. A network is any collection of independent computers that exchange information with each other over a shared communication medium. Local Area Networks or LANs are usually confined to a limited geographic area, such as a single building or a college campus. LANs can be small, linking as few as three computers, but can often link hundreds of computers used by thousands of people. The development of standard networking protocols and media has resulted in worldwide proliferation of LANs throughout business and educational organizations.

Ethernet is the most popular physical layer LAN technology in use today. It defines the number of conductors that are required for a connection, the performance thresholds that can be expected, and provides the framework for data transmission. A standard Ethernet network can transmit data at a rate up to 10 Megabits per second (10 Mbps). Other LAN types include Token Ring, Fast Ethernet, Gigabit Ethernet, 10 Gigabit Ethernet, Fiber Distributed Data Interface (FDDI), Asynchronous Transfer Mode (ATM) and LocalTalk.

Ethernet is popular because it strikes a good balance between speed, cost and ease of installation. These benefits, combined with wide acceptance in the computer marketplace and the ability to support virtually all popular network protocols, make Ethernet an ideal networking technology for most computer users today.

The Institute for Electrical and Electronic Engineers developed an Ethernet standard known as IEEE Standard 802.3. This standard defines rules for configuring an Ethernet network and also specifies how the elements in an Ethernet network interact with one another. By adhering to the IEEE standard, network equipment and network protocols can communicate efficiently.

The Fast Ethernet standard (IEEE 802.3u) has been established for Ethernet networks that need higher transmission speeds. This standard raises the Ethernet speed limit from 10 Mbps to 100 Mbps with only minimal changes to the existing cable structure. Fast Ethernet provides faster throughput for video, multimedia, graphics, Internet surfing and stronger error detection and correction.

There are three types of Fast Ethernet: 100BASE-TX for use with level 5 UTP cable; 100BASE-FX for use with fiber-optic cable; and 100BASE-T4 which utilizes an extra two wires for use with level 3 MP cable. The 100BASE-TX standard has become the most popular due to its close compatibility with the 10BASE-T Ethernet standard.

Gigabit Ethernet was developed to meet the need for faster communication networks with applications such as multimedia and Voice over IP (VoIP). Also known as "gigabit-Ethernet-over-copper" or 1000Base-T, GigE is a version of Ethernet that runs at speeds 10 times faster than 1009Base-T. It is defined in the IEEE 802.3 standard and is currently used as an enterprise backbone. Existing Ethernet LANs with 10 and 100 Mbps cards can feed into a Gigabit Ethernet backbone to interconnect high performance switches, routers and servers.

From the data link layer of the OSI model upward, the look and implementation of Gigabit Ethernet is identical to that of Ethernet. The most important differences between Gigabit Ethernet and Fast Ethernet include the additional support of full duplex operation in the MAC layer and the data rates.

An Ethernet system may use either a twisted copper-pair or coaxial-based transport system. The most commonly used cable for Ethernet is a category 5 unshielded twisted pair (UTP) cable. Alternatively, a wired network may simply uses existing phone wiring existing in most homes to connect multiple computers and devices. In addition coaxial cable may be used as the underlying network transport medium.

10 Gigabit Ethernet is the fastest and most recent of the Ethernet standards. IEEE 802.3ae defines a version of Ethernet with a nominal rate of 10 Gbits/s that makes it 10 times faster than Gigabit Ethernet. Unlike other Ethernet systems, 10 Gigabit Ethernet is based entirely on the use of optical fiber connections. This developing standard is moving away from a LAN design that broadcasts to all nodes, toward a system which includes some elements of wide area routing. As it is still very new, which of the standards will gain commercial acceptance has yet to be determined.

The network 422 shown in FIGS. 4A and 4B may comprise a wireless Local Area Network under one embodiment. The WLAN enables communications among networked components using Wi-Fi protocols. Wi-Fi (or WiFi) is a local area wireless computer networking technology that allows electronic devices to network, mainly using the 2.4 gigahertz Ultra High Frequency (UHF) and 5 gigahertz Super High Frequency (SHF) ISM radio bands.

The Wi-Fi Alliance defines Wi-Fi as any wireless local area network (WLAN) product based on the Institute of Electrical and Electronics Engineers (IEEE) 802.11 standards. However, the term "Wi-Fi" is used in general English as a synonym for "WLAN" since most modern WLANs are based on these standards. "Wi-Fi" is a trademark of the Wi-Fi Alliance. The "Wi-Fi Certified" trademark can only be used by Wi-Fi products that successfully complete Wi-Fi Alliance interoperability certification testing.

Many devices can use Wi-Fi, e.g. personal computers, video-game consoles, smartphones, digital cameras, tablet computers and digital audio players. These can connect to a network resource such as the Internet via a wireless network access point (e.g. wireless router). Such an access point (or hotspot) has a range of about 20 meters (66 feet) indoors and a greater range outdoors. Hotspot coverage can be as small as a single room with walls that block radio waves, or as large as many square kilometers achieved by using multiple overlapping access points.

Wi-Fi can be less secure than wired connections, such as Ethernet, precisely because an intruder does not need a physical connection. Web pages that use Transport Layer Security (TLS) are secure, but unencrypted internet access can easily be detected by intruders. Because of this, Wi-Fi has adopted various encryption technologies. The early encryption WEP proved easy to break. Higher quality protocols (WPA, WPA2) were added later.

The network 422 shown in FIGS. 4A and 4B may comprise a personal area network or wireless personal area network under one embodiment. A personal area network (PAN) is a computer network used for data transmission among devices such as computers, telephones and personal digital assistants. PANs can be used for communication among the personal devices themselves (intrapersonal communication), or for connecting to a higher level network and the Internet (an uplink).

A wireless personal area network (WPAN) is a personal area network—a network for interconnecting devices centered on an individual person's workspace—in which the connections are wireless. Wireless PAN is based on the standard IEEE 802.15. One type of wireless technology used for WPAN is Bluetooth. Bluetooth uses short-range radio waves over distances up to approximately 10 meters. For example, Bluetooth devices such as a keyboards, pointing devices, audio head sets, printers, and embedded microcontrollers may connect to personal digital assistants (PDAs), smart phones, routers, or computers wirelessly. Further, a WPAN may also enable communications among networked components using Wireless USB, Zigbee or Z-Wave communication protocols.

As already indicated above, FIGS. 4A and 4B show that the disconnect device 412, 418 is communicatively coupled with computer 404, hub 402, and router 406 via network 422. The network 422 may comprise one or more of a Wired Local Area Network (LAN), a Wireless Local Area Network (WLAN), or a Wireless Personal Area Network (WPAN). FIG. 4A shows a computer 404 communicatively coupled with router 406 and hub 402 through network 422. The local router 406 is further coupled to the internet providing internet and/or general network connectivity to both the router 406, hub 402, computer 404, and disconnect device 412, 418.

Under one embodiment, the network may provide communicative pathways to the signal generator 408 and/or lightning sensor 416. Accordingly, the signal generator and/or lightning sensor may then communicatively couple with computer 404, hub 402, and router 406 via network 422. FIG. 4A shows a computer 404 communicatively coupled with router 406 and hub 402 through network 422. The local router 406 is further coupled to the internet providing internet and/or general network connectivity to the signal generator 408 and/or lightning sensor 416.

It should also be noted that any combination of the computer 404, router 406, hub 402, disconnect device 412, 418, signal generator 408, lightning arrestor 416, and/or remote servers (communicatively coupled with any of the aforementioned components) may communicatively couple through other networking pathways including global positioning systems and cellular networks.

The lightning strike surge protection systems and methods described herein comprise at least one application for monitoring local weather conditions. As one example, a weather monitoring application may run on at least one processor of the computer 404 shown in FIG. 4A. The weather monitoring application may be designed to monitor available internet weather services and use custom algorithms to track and predict electric storm activity in a specific area. A control application running on at least one processor of the hub 402 shown in FIG. 4A may under an embodiment receive information processed by the weather monitoring application. Further, the hub device 402 may communicate with a lightning disconnect device 412, 418 through one or more of the wired/wireless network technologies described above. The weather monitoring application may initiate a triggering of the lightning disconnect device when storm activity is within any specific radius from a property (two, three, four miles, etc.) comprising the protected pet containment system. Under an embodiment, the control application receives a disconnect command from the weather monitoring application and communicates a disconnect command to the disconnect device. The disconnect device then decouples the boundary loop wire from the transmitter.

It should be noted that the weather application and control application may run on any combination of computer 404, hub 402 and/or remote servers communicatively coupled to computer 404 and hub 402. Further, the weather application and control application may comprise a single or multiple application(s) running a computer 404, a hub 402 and/or a remote server(s) communicatively coupled to computer 404 and hub 402. In any such case, the weather application and/or control application may communicate with an application running on a customer's mobile computing device to send and receive information to and from a customer.

Occurrences of a disconnect may depend upon timeframes. One example of a specific timeframe disconnect might include a disconnect during summer months versus winter months when ice may form over bodies of water. A boundary loop wire may surround bodies of water to protect an animal from venturing out onto dangerous ice layers during the winter months.

The weather monitoring application described above may make use of weather APIs:

USPLN™ (United States Precision Lightning Network) and NAPLN™ (North American Precision Lightning Network) real-time data are delivered within 1 minute or less from lightning detection, with near real-time options such as 5-minute or 15-minute files. Internet delivery protocols include direct socket connection, HTTP, LDM and FTP. Coverage areas can be as small as 25-mile radius areas to complete regional coverage, such as the US, Canada and Gulf of Mexico. Data content generally consists of the following elements: Date and time (UTC); Latitude and longitude (decimal degrees); Peak amplitude current estimates with polarity for cloud-to-ground events (0 value for cloud lightning); Error ellipse information.

Vaisala Global Lightning Dataset GLD360 is a service that provides real-time lightning data for accurate and early detection and tracking of severe weather. The data provided is generated by a Vaisala owned and operated world wide network. The service detects and reports lightning as it happens. The services provides real-time global lightning coverage.

There are other services for monitoring weather in general that may be leveraged, like OpenWeatherMap and Weather Underground.

The weather monitoring application described above may also make use of other weather APIs such as BloomSky, CliMate, Metwit, Wezzoo, Weathermob, StormTag/WeatherSignal, etc. to monitor local weather and environmental conditions.

BloomSky—as the "world's first smart weather camera," BloomSky is a weather probe that consumers can place in a yard or on a roof that captures hyperlocal weather conditions data. The goal of BloomSky is to build a crowdsourced meteorological network that provides real-time weather monitoring and weather data to consumers.

CliMate—CliMate comprises a Bluetooth-enabled environment tracker that measures humidity, temperature and UVI. The data is synced to a consumer's smartphone, and each piece of data is used to power WeatherBook, a crowdsourced, real-time weather map.

Metwit—Metwit comprises a crowdsourced API platform that provides local weather and environmental data to third-party applications. Metwit collects weather information from Twitter, Instagram, the National Oceanic and Atmospheric Administration and other sources.

Wezzoo—Wezzoo comprises a crowdsourced weather app available on Android and iOS. Users can share local weather observations and access real-time weather maps from around the world.

Weathermob—Weathermob comprises a large community-based weather service that captures real-time weather data via mobile, social and meteorological data sources. Weathermob is only available on iOS.

StormTag/WeatherSignal—StormTag and WeatherSignal are weather-based projects created by OpenSignal. StormTag is a Bluetooth weather station that attaches to a keychain. The weather data collected by the device is sent to the WeatherSignal app and OpenSignal servers.

As described above, the weather monitoring application may be designed to monitor available internet weather services and use custom algorithms to track and predict electrical storm activity in a specific area. The application may receive real time information from a real-time lighting data service and track whether a storm is approaching a containment system of a service customer. In that case the application may either send a signal to the disconnect device to disconnect the loop wire or notify the customer of the events and ask whether or not to disable the system. The application may receive information from real time weather services regarding electrical storms in the areas where service systems are installed and use this data to make a better decision on whether or not to disconnect a system. The algorithm comprises an adjustable threshold regarding the strike distance and path for disconnecting the system. The parameters that the algorithm may use would be location based with the ability to track the lightning strike movement towards and away from the system. Typically the storm activity would trigger a disconnect at 1.5 to 2 miles from the containment installation. If the peak amplitude measurements are above a predefined threshold the triggered disconnect could occur at increasingly greater distances since lightning ground currents can travel several miles from the lightning strike point. The greater the amplitude the farther the ground currents can travel.

An onboard or tethered lightning sensor incorporated into a disconnect device may detect electrical emissions from lightning activity and provide distance estimations. The lightning sensor may comprise a device similar to the AS3935 Franklin Lightning Sensor. An algorithm of the weather monitoring application may use such distance estimations in additional to local weather data to track an inbound electrical storm to, over and away from the protected property. Under an alternative embodiment, the lightning sensor operates independently of the weather monitoring application.

The AS3935 generates an assessment of the estimated distance to the head of an approaching storm. This assessment is done based on statistical calculation. The energy of the single event (lightning) provided by an Energy Calculation block is stored in an internal memory, together with timing information, in the AS3935. The events stored in the memory are then correlated with a look-up table by the statistical distance estimation block, which provides a final estimation of the distance to the head of the storm. The estimated distance is directly represented in km with a range of 10 to 40 km. The disconnect device would be pre-programmed to disconnect the boundary wire from the signal generator at a specific detection distance and reconnect after the AS3935 determined that the storm had passed. A reasonable disconnect/reconnect distance would be in the 2.5 to 3.5 km range.

An analog front end AFE of the sensor amplifies and demodulates signals picked up by the antenna. A lightning algorithm block is activated in the event any activities are detected at the antenna. As this happens the output signal of the AFE is evaluated by a Signal Validation block, which checks the pattern of the received signal. The signal validation checks the shape of the received signal. In particular, the AS3935 may reject impulse signals, like spikes, picked up by the antenna. If the received signal is classified as lightning, the energy is calculated. The result of the energy calculation is then stored.

As indicated above, the AS3935 generates an assessment of the estimated distance to the head of an approaching storm. This assessment is done based on statistical calculation. The energy of the single event (lightning) provided by the Energy Calculation block is stored in an internal memory, together with timing information, in the AS3935. The events stored in the memory are then correlated with a look-up table by the statistical distance estimation block, which provides a final estimation of the distance to the head of the storm.

A lightning disconnect device (as shown by FIG. 4B in either location 412 or 418) may be set to trigger as the storm is within a first set range and reset as the storm is sensed beyond a second set range. The second set range may be the same or different from the first set range. A timer, user selected, may also be set as each surge is sensed. This may under an embodiment allow the lightning disconnect device to reset in the event surges are not detected after the storm has passed, i.e. after a duration of time passes after the detected surge.

In the event a loop disconnect occurs, the owner of the system may under one embodiment be automatically notified via email, text message or other electronic means. This is extremely important since the boundary loop wire will be disconnected and no signal field will be present at the boundary. This can result in an animal going beyond the set boundary and being injured.

The systems and methods discussed herein may operate in an automatic mode (i.e. the electrical storm is detected and the disconnect device engages) or manual mode (i.e. an alert is sent to the customer who then decides to manually disconnect the system through a mobile device application or text reply).

A system is described that comprises under one embodiment a signal generator, a boundary loop wire, and a disconnect device, wherein the boundary loop wire is positionable at a location to define a boundary of a containment area, wherein the disconnect device is configured to communicatively couple over a network with one or more applications, wherein the one or more applications run on at least one processor. The system includes the signal generator for driving a current through the boundary loop wire. The system includes the disconnect device comprising a first component for disconnecting the boundary loop wire from the signal generator. The system includes the one or more applications configured to send the disconnect device an instruction, wherein the instruction comprises disconnecting the boundary loop wire from the signal generator.

The network of an embodiment couples with at least one device that provides internet connectivity to the network.

The network of an embodiment comprises at least one of a Wired Local Area Network (LAN), a Wireless Local Area Network (WLAN), and a Wireless Personal Area Network (WPAN).

The first component of an embodiment comprises a high voltage relay.

The power source terminals of the signal generator are connected to the boundary loop wire, under an embodiment.

The disconnecting the boundary loop wire from the signal generator creates an open loop between the power source terminals, under an embodiment.

The disconnect device of an embodiment comprises a second component for closing the open loop between the power source terminals to prevent a disconnect alarm of the signal generator from reporting the open loop.

The second component of an embodiment comprises a small signal relay.

The sending the instruction including sending the instruction in response to an occurrence of an event, under an embodiment.

The one or more applications of an embodiment receive real time weather data over the network.

The real time weather data of an embodiment comprises information of weather activity in a geographic region, wherein the geographic region includes the location.

The information of an embodiment includes a strike location of at least one first lightning strike.

The information of an embodiment includes peak current amplitude of at the least one first lightning strike.

The occurrence of the event comprises under an embodiment the strike location occurring within a first distance.

The occurrence of the event comprises under an embodiment the peak current amplitude exceeding a first value.

The sending the instruction comprises under an embodiment the one or more applications automatically sending the instruction in response to the occurrence of the event.

The sending the instruction comprises under an embodiment the one or more applications automatically providing a notification over the network to a mobile application running on a processor of a mobile computing device, wherein the notification informs a user of the occurrence of the event.

The sending the instruction comprises under an embodiment the one or more applications receiving an indication from the mobile application to send the instruction.

The system comprises a battery backup, under an embodiment.

The signal generator of an embodiment is configured to connect to a battery backup for power supply in the event of a power outage.

The disconnect device of an embodiment is configured to connect to the battery backup for power supply in the event of a power outage.

The disconnect device of an embodiment includes a lightning sensor.

The lightning sensor of an embodiment is configured to connect to the battery backup, wherein the lightning sensor is configured to detect at least one second lightning strike in the event of a power outage.

The lightning sensor of an embodiment is configured to send the instruction, wherein the sending the instruction includes automatically sending the instruction in response to the detecting the at least one second lightning strike within a second distance from the location.

The detecting includes the lightning sensor receiving information of the at least one second lightning strike and using the information to confirm that the at least one second lightning strike comprises lightning strike activity, under an embodiment.

The detecting includes the lightning sensor estimating the distance of the at least one second lightning strike from the location, under an embodiment.

The estimating includes detecting energy of the at least one second lightning strike, under an embodiment The estimating including correlating the detected energy with lookup table data, under an embodiment.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods for providing lightning strike surge protection can be a component of a single system, multiple systems, and/or geographically separate systems. The systems and methods for providing lightning strike surge protection can also be a subcomponent or subsystem of a single system, multiple systems, and/or geographically separate systems. The components of systems and methods for providing lightning strike surge protection can be coupled to one or more other components (not shown) of a host system or a system coupled to the host system.

One or more components of the systems and methods for providing lightning strike surge protection and/or a corresponding interface, system or application to which the systems and methods for providing lightning strike surge protection is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods for providing lightning strike surge protection can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods for providing lightning strike surge protection and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods for providing lightning strike surge protection and corresponding systems and methods include: microcontrollers with memory (such as electronically erasable programmable read only memory (EEPROM)), embedded microprocessors, firmware, software, etc. Furthermore, aspects of the systems and methods for providing lightning strike surge protection and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods for providing lightning strike surge protection and corresponding systems and methods is not intended to be exhaustive or to limit the systems and methods to the precise forms disclosed. While specific embodiments of, and examples for, the systems and methods for providing lightning strike surge protection and corresponding systems and methods are described herein for illustrative purposes, various equivalent modifications are possible within the scope of the systems and methods, as those skilled in the relevant art will recognize. The teachings of the systems and methods for providing lightning strike surge protection and corresponding systems and methods provided herein can be applied to other systems and methods, not only for the systems and methods described above.

The elements and acts of the various embodiments described above can be combined to provide further embodiments. These and other changes can be made to the systems and methods for providing lightning strike surge protection and corresponding systems and methods in light of the above detailed description.

It is understood that the systems and methods for providing lightning strike surge protection described herein are merely illustrative. Other arrangements may be employed in accordance the embodiments set forth below. Further, variations of the systems and methods for providing lightning strike surge protection described herein may comply with the spirit of the embodiments set forth herein.

What is claimed is:

1. A system comprising,
a signal generator, a boundary loop wire, and a disconnect device, wherein the boundary loop wire is positionable at a location to define a boundary of a containment area, wherein the disconnect device is configured to communicatively couple over a network with one or more applications, wherein the one or more applications run on at least one processor, wherein the one or more applications receive real time weather information from a remote source through the network;
the signal generator for driving a current through the boundary loop wire;
the disconnect device comprising a first component for disconnecting the boundary loop wire from the signal generator, wherein the disconnecting comprises operation of the first component in preventing flow of current through the boundary loop wire;

the one or more applications configured to monitor the real time weather information and to send the disconnect device an instruction in response to an occurrence of a lightning strike within a first distance of the location, wherein the real time weather information indicates the occurrence of the lightning strike, wherein the one or more applications are configured to adjust the first distance based on an electrical characteristic of the lightning strike, wherein the instruction comprises a direction to disconnect the boundary loop wire from the signal generator.

2. The system of claim 1, wherein the network couples with at least one device that provides internet connectivity to the network.

3. The system of claim 2, wherein the network comprises at least one of a Wired Local Area Network (LAN), a Wireless Local Area Network (WLAN), and a Wireless Personal Area Network (WPAN).

4. The system of claim 1, wherein the first component comprises a high voltage relay.

5. The system of claim 1, wherein power source terminals of the signal generator are connected to the boundary loop wire.

6. The system of claim 5, wherein the disconnecting the boundary loop wire from the signal generator creates an open loop between the power source terminals.

7. The system of claim 6, wherein the disconnect device comprises a second component for closing the open loop between the power source terminals to prevent a disconnect alarm of the signal generator from reporting the open loop.

8. The system of claim 7, wherein the second component comprises a small signal relay.

9. The system of claim 1, wherein the real time weather information comprises information of weather activity in a geographic region, wherein the geographic region includes the location.

10. The system of claim 9, wherein the real time weather information includes a strike location of a strike.

11. The system of claim 10, the occurrence of the lightning strike within the first distance comprising the corresponding strike location located within the first distance.

12. The system of claim 10, wherein the real time weather information includes peak current amplitude of the lightning strike, wherein the electrical characteristic comprises the peak current amplitude.

13. The system of claim 12, the adjusting the first distance comprising increasing the first distance when the peak current amplitude exceeds a first value.

14. The system of claim 1, the sending the instruction comprising the one or more applications automatically providing a notification over the network to a mobile application running on a processor of a mobile computing device, wherein the notification informs a user of the occurrence of the lightning strike.

15. The system of claim 14, the sending the instruction comprising the one or more applications receiving an indication from the mobile application to send the instruction.

16. The system of claim 1, comprising a battery backup.

17. The system of claim 16, wherein the signal generator is configured to connect to a battery backup for power supply in the event of a power outage.

18. The system of claim 16, wherein the disconnect device is configured to connect to the battery backup for power supply in the event of a power outage.

19. The system of claim 16, wherein the disconnect device includes a lightning sensor.

20. The system of claim 19, wherein the lightning sensor is configured to connect to the battery backup, wherein the lightning sensor is configured to detect the occurrence of a lightning strike in the event of a power outage.

21. The system of claim 20, wherein the lightning sensor is configured to send the instruction, wherein the sending the instruction includes automatically sending the instruction in response to the detecting the lightning strike within the first distance from the location.

22. The system of claim 21, the detecting including the lightning sensor receiving information of the lightning strike and using the information to confirm that the lightning strike comprises lightning strike activity.

23. The system of claim 22, the detecting including the lightning sensor estimating the distance of the lightning strike from the location.

24. The system of claim 23, the estimating including detecting energy of the lightning strike.

25. The system of claim 24, the estimating including correlating the detected energy with lookup table data.

* * * * *